(12) United States Patent
Yoshimura et al.

(10) Patent No.: US 8,690,184 B2
(45) Date of Patent: Apr. 8, 2014

(54) VEHICLE AIRBAG SYSTEM

(75) Inventors: Toshiteru Yoshimura, Hiroshima (JP);
Tsuyoshi Shimono, Hiroshima (JP);
Daisuke Matsuoka, Hiroshima (JP);
Yamehito Tamura, Hiroshima (JP);
Koji Kuwabara, Hiroshima (JP);
Masayoshi Ono, Hiroshima (JP);
Hiroyuki Kawai, Hiroshima (JP);
Kazuhiro Tanaka, Hiroshima (JP)

(73) Assignees: DaikyoNishikawa Corporation,
Hiroshima (JP); **Mazda Motor
Corporation**, Hiroshima (JP)

( * ) Notice: Subject to any disclaimer, the term of this patent is extended or adjusted under 35 U.S.C. 154(b) by 0 days.

(21) Appl. No.: 13/608,932

(22) Filed: Sep. 10, 2012

(65) Prior Publication Data

US 2013/0076010 A1 Mar. 28, 2013

(30) Foreign Application Priority Data

Sep. 22, 2011 (JP) ................................. 2011-207781
Jun. 27, 2012 (JP) ................................. 2012-144079

(51) Int. Cl.
*B60R 21/16* (2006.01)

(52) U.S. Cl.
USPC ....................................................... 280/728.2

(58) Field of Classification Search
USPC .................................... 280/728.2, 728.3, 732
See application file for complete search history.

(56) References Cited

U.S. PATENT DOCUMENTS

| | | | |
|---|---|---|---|
| 5,295,707 A | 3/1994 | Satoh et al. | |
| 5,326,132 A | 7/1994 | Musiol et al. | |
| 5,342,090 A * | 8/1994 | Sobczak et al. | 280/732 |
| 5,505,484 A | 4/1996 | Miles et al. | |
| 5,887,891 A * | 3/1999 | Taquchi et al. | 280/728.2 |
| 6,394,485 B1 * | 5/2002 | Amamori | 280/728.2 |
| 7,188,860 B2 * | 3/2007 | Hayashi | 280/728.2 |
| 2006/0043700 A1 * | 3/2006 | Tsujimoto et al. | 280/728.2 |
| 2006/0267314 A1 * | 11/2006 | Yasuda et al. | 280/728.3 |
| 2007/0235987 A1 * | 10/2007 | Boggess et al. | 280/728.2 |

FOREIGN PATENT DOCUMENTS

| | | |
|---|---|---|
| DE | 4308693 A1 | 9/1993 |
| JP | H09-226496 A | 9/1997 |
| JP | 2004-352118 A | 12/2004 |
| JP | 2010-042709 A | 2/2010 |
| JP | 4617766 | 11/2010 |
| KR | 10-2004-0043570 A | 5/2004 |

OTHER PUBLICATIONS

An Office Action issued by the DPMA( Deutshces Patent—und Markenamt) on Oct. 17, 2013, which corresponds to German Patent Application No. 10 2012 017 743.7 and is related to U.S. Appl. No. 13/608,932.

* cited by examiner

*Primary Examiner* — Joseph M Rocca
*Assistant Examiner* — Robert A Coker
(74) *Attorney, Agent, or Firm* — Studebaker & Brackett PC

(57) ABSTRACT

A back plate 7 is provided to a backside of a case 8 which accommodates an airbag 11 of an airbag module 5 to reduce the deformation of the case 8 toward a back side in the event of airbag deployment. The back plate 7 is supported on a steering member or the case 8, and an upper portion of the back plate 7 is held on a back support 19 protruding from the instrument panel 1.

6 Claims, 9 Drawing Sheets

VEHICLE AIRBAG SYSTEM

CROSS-REFERENCE TO RELATED APPLICATION

This application claims priority to Japanese Patent Application No. 2011-207781 filed on Sep. 22, 2011, and Japanese Patent Application No. 2012-144079 filed on Jun. 27, 2012, the disclosures of which including the specifications, the drawings, and the claims are hereby incorporated by reference in its entirety.

BACKGROUND

The present disclosure relates to vehicle airbag systems.

Conventionally, an airbag module has been mounted in a vehicle's instrument panel above a steering member extending in the vehicle's width direction, and an airbag is deployed in front of an occupant in a passenger seat in the event of impact to the vehicle. The airbag module includes an airbag accommodated in a case and a gas generator. To increase the workability of checking and changing these components, it is preferable to design the airbag systems such that the airbag module can be easily mounted and removed.

An example vehicle airbag system designed from the above aspect is disclosed in Japanese Patent No. 4617766. In this example, a lower portion of the airbag module is supported on the steering member, and a front portion and a back portion of the airbag module are held on front and back support portions which protrude downward from the instrument panel, by hook members. Specifically, a bracket protruding downward from the case of the airbag module is provided, and this bracket is fastened to a bracket of the steering member with a bolt and a nut. The hook member on the front side is welded to a front surface of the case, and is hooked into a hole formed in the front support portion of the instrument panel. The hook member on the back side is fastened to a base bracket welded to a back surface of the case with a bolt and a nut, and is hooked into a hole formed in the back support portion of the instrument panel.

In this example, to remove the airbag module from the instrument panel, the back hook member and the back surface of the case are unfastened, and the back hook member is detached from the back support portion of the instrument panel. Then, the bracket at the lower portion of the case and the bracket of the steering member are unfastened. As a result, the hook member on the front surface of the case can be detached from the front support portion of the instrument panel, thereby making it possible to remove the airbag module.

The Japanese Patent No. 4617766 also discloses an impact absorber provided to the case of the airbag module and the base bracket, to allow smooth deformation of the case and the base bracket in the event when an impact load is applied to the instrument panel from above.

According to the above airbag system, in the event of impact to a vehicle, such as frontal collisions, a sensor (not shown) detects the impact, and the gas generator operates to inject gas into the airbag accommodated in the case. The gas inflates the folded airbag and causes airbag deployment. Due to this deployment pressure, a cleavage lid formed in the upper wall of the instrument panel is torn open, and the airbag expands in the vehicle.

In the airbag deployment, the airbag case in the airbag module is deformed to expand to the back side due to the airbag deployment pressure. If this deformation is large, it may cause delay in the airbag deployment (i.e., the airbag does not deploy immediately), and the deployment performance of the airbag is reduced. A structural bead may be provided to the wall of the airbag case to increase the stiffness of the airbag case. However, the unevenness of the wall of the airbag case formed by the structural bead may cause a disadvantage to the airbag deployment.

SUMMARY

According to the present disclosure, the airbag can be smoothly deployed by reducing the deformation of the airbag case caused by the airbag deployment pressure.

To solve the above problem, a back plate is provided in the present disclosure to reduce the deformation of the airbag.

Specifically, a vehicle airbag system disclosed herein includes an airbag module located inside an instrument panel, the airbag module having an airbag accommodated in a case and a gas generator which generates an airbag inflation gas, wherein the vehicle airbag system includes: a front support located at a front side of the airbag module and protruding downward from the instrument panel; and a back support located at a back side of the airbag module and protruding downward from the instrument panel, the case is supported on a steering member extending in a vehicle width direction inside the instrument panel and is held on the front support, a back plate including a stiffness portion which reduces deformation of the case toward the back side in the event of deployment of the airbag is located on a back side of the case, and the back plate is supported on the steering member or the case, and an upper portion of the back plate is held on the back support.

In this structure, the stiffness portion of the back plate prevents the case from being significantly deformed backward due to the deployment pressure of the airbag, and therefore, it is possible to avoid deployment malfunction, such as delay in deployment of an airbag.

It is preferable that the stiffness portion of the back plate includes a plurality of beads extending in the vehicle width direction and arranged vertically to each other. In this structure, the beads increase the stiffness of the stiffness portion of the back plate with respect to a bending of the back plate, that is, a backward displacement of a middle portion of the back plate relative to the both ends of the back plate in the vehicle width direction (hereinafter this bending is called "lateral bending"), and it is possible to reduce the backward deformation of the case in a simple structure. Moreover, such beads can be easily formed by press molding the back plate.

It is preferable that an impact absorber which allows easy deformation when an impact load is applied to the instrument panel from above, is provided at a location lower than the stiffness portion of the back plate. The impact absorber is a structure relating to head impact protection. If the stiffness of the instrument panel in a vertical direction is increased by providing the back plate to the back of the airbag case, it may cause adverse effect in protecting a passenger who collides with the upper surface of the instrument panel 1 in an accident, etc. In view of this, the impact absorber is provided so that the back plate can be easily deformed when an impact load is applied to the instrument panel from above, and the impact energy is absorbed by the deformation. As a result, the passenger can be advantageously protected.

The impact absorber can be comprised, for example, of a bent portion obtained by bending part of the back plate toward the back side. In this case, the back plate is significantly bent at the bent portion when an impact load is applied to the instrument panel from above. As a result, the impact energy can be absorbed.

It is preferable that the airbag is folded into a rectangular shape in plan view and is accommodated in the case, and the stiffness portion of the back plate extends only in the vehicle width direction, and the case includes corner cover portions which cover both corner portions of a back side of the folded airbag.

In this structure, although the stiffness portion of the back plate extends only in the vehicle width direction, the corner cover portions of the case guide the deployment and expansion of the airbag, and therefore, the airbag smoothly deploys and expands. The back plate may be a plate extending only in the vehicle width direction. Thus, the back plate can be formed easily.

To support the back plate on the case, it is preferable that a lower end portion of a back wall of the case is provided with a plurality of projections which project to the back side; a head of a stud bolt is housed in a depression formed by a corresponding one of the projections, and a shank portion of the stud bolt passes through the corresponding one of the projections; and a lower end portion of the back plate is supported on the back wall of the case with a nut fastened to the stud bolt.

In this support structure, the vertical length of the back plate (the dimension from the hook portion on the back support to the portion supported on the case) is shorter than the vertical length of the back plate supported on the steering member. This means that a backward bending moment applied to the back plate due to the deployment pressure of the airbag is small. Thus, the back plate does not lean easily, which results in stable deployment of the airbag. Further, it is possible to prevent the back support projecting downward from the instrument panel, from being damaged. As a result, it is possible to reduce the number of reinforcement elements of the airbag system, and advantageously reduce the weight of the airbag system.

Here, the Japanese Patent No. 4617766 also discloses a hook member provided on a back side and supported on a case. However, the hook member is fastened to the case via a base bracket which is provided with a stud bolt and fixed to the case beforehand.

In contrast, in the support structure according to the present disclosure, the projections are provided on the back wall of the case, and the heads of the stud bolts for supporting the back plate are housed in depressions formed by the projections. Thus, the heads of the stud bolts does not project in the case. Accordingly, the airbag and the gas generator are advantageously accommodated in the case, and the airbag is advantageously deployed in a smooth manner. That is, according to the above support structure, unlike the structure disclosed in the Japanese Patent No. 4617766, the back plate can be supported on the case without a special bracket, and moreover without causing any difficulty in the accommodation of the airbag and the gas generator in the case, and deployment of the airbag. As a result, the structure of the airbag system is simplified, and the weight of the airbag system is advantageously reduced.

It is preferable that the front support and the back support are comprised of a front portion and a back portion of a sleeve-like airbag chute fixed to the instrument panel, and a sleeve-like reinforcement member is fitted to the airbag chute to reduce deformation of the airbag chute in the event of expansion of the airbag. The deployment pressure of the airbag is applied to the airbag chute via the back plate. Thus, if the airbag chute is deformed due to the deployment pressure, it may obstruct smooth deployment of the airbag. To reduce the deformation of the airbag chute, the airbag chute is reinforced by the sleeve-like reinforcement member. As a result, the airbag is advantageously deployed and expanded in a smooth manner.

DETAILED DESCRIPTION

Embodiments of the present disclosure will be described below based on the drawings. The foregoing embodiments are merely preferred examples in nature, and are not intended to limit the scope, applications, and use of the invention.

Figure 1:
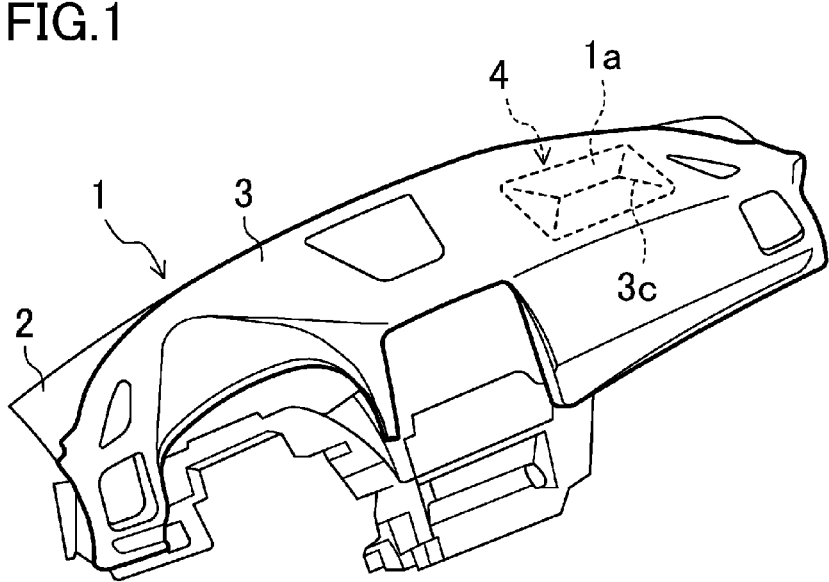
FIG. 1 is an oblique view of an instrument panel.
Figure 2:
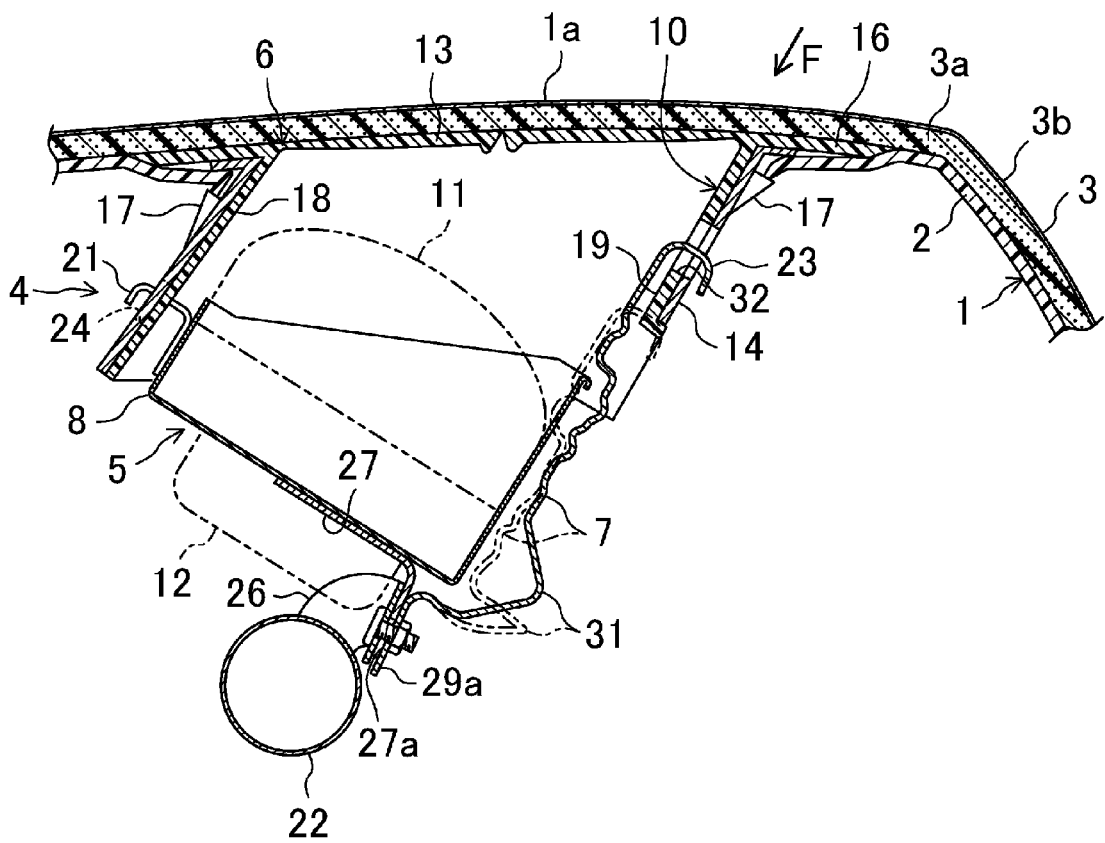
FIG. 2 is a cross-sectional view of an airbag system according to the first embodiment.

FIG. 1 shows an instrument panel 1 of a vehicle. In FIG. 1, the reference character 2 is a panel body made of synthetic resin, and the reference character 3 is a trim covering the surface of the panel body 2. The trim 3 includes a urethane foam layer 3a and a surface layer 3b as shown in FIG. 2. An airbag system 4 is mounted in the passenger side of the instrument panel 1. The airbag system 4 is to protect an occupant in the passenger seat by deploying an airbag from a cleavage lid 1a formed in the upper wall of the instrument panel 1 in the event of impact to the vehicle. A cleavage groove 3c is formed in the backside of the trim 3.

First Embodiment

<Configuration of Airbag System>

Figure 3:
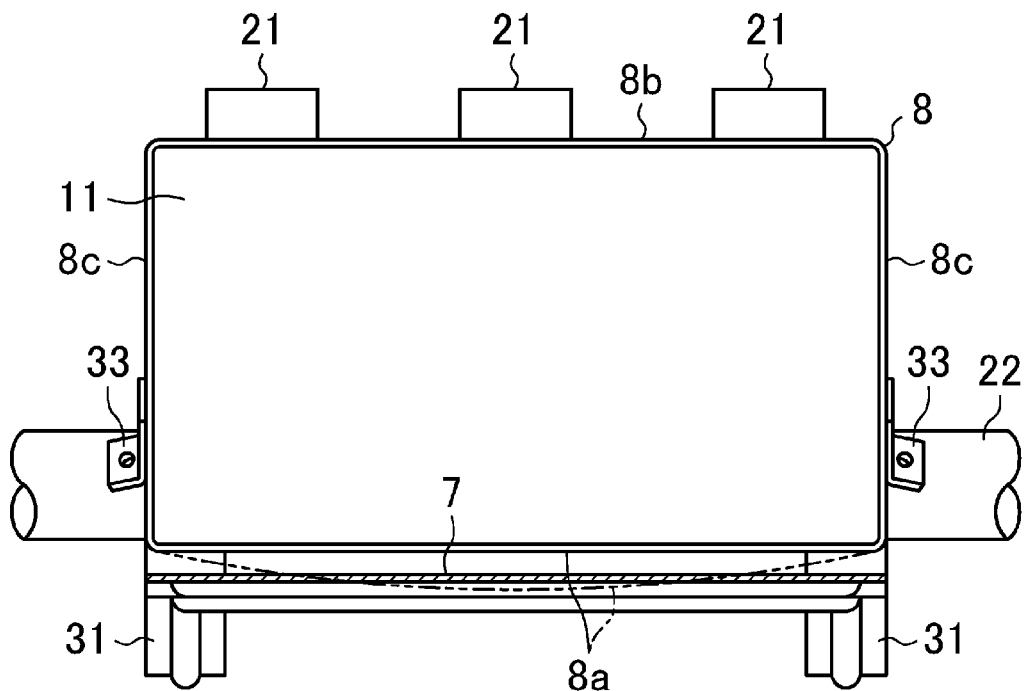
FIG. 3 is a plan view illustrating a relationship between an airbag module and a back plate according to the first embodiment.

As shown in FIG. 2, the airbag system 4 includes an airbag module 5, an airbag chute 6, and a back plate 7. The airbag module 5 includes an airbag 11 accommodated in a case 8 made of a steel sheet, and a gas generator (an inflator) 12 which generates an airbag inflation gas. The gas generator 12 in this example is disc shaped, and is mounted on the bottom of the case 8. As shown in FIG. 3, the case 8 is an angular case with a rectangular opening. The airbag 11 is folded into a rectangular shape in plan view, and is accommodated in the case 8.

Figure 4:
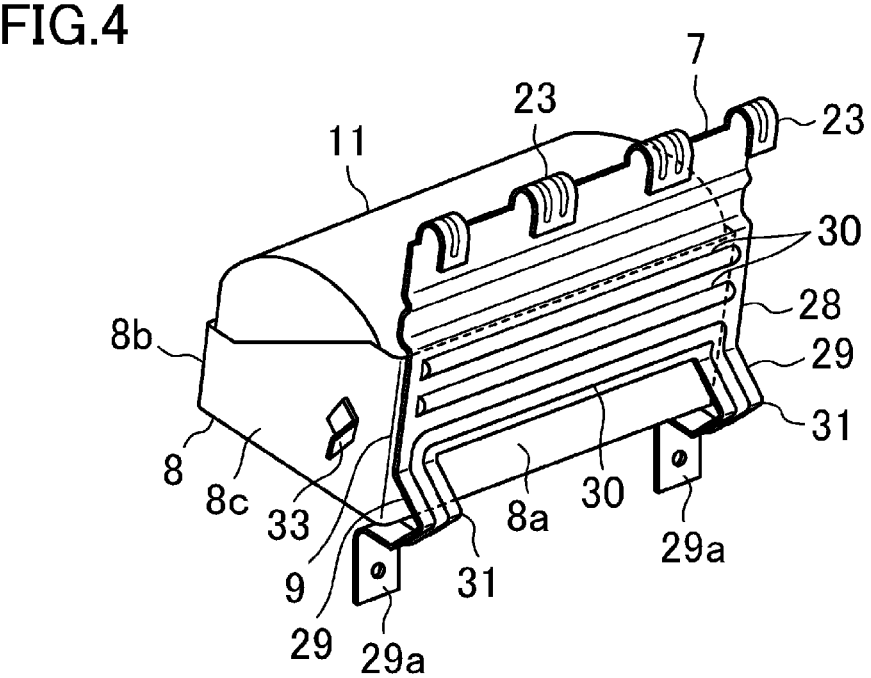
FIG. 4 is an oblique view illustrating a relationship between the airbag module and the back plate according to the first embodiment.

As shown in FIG. 4, a back wall 8a of the case 8 is taller than a front wall 8b of the case 8 so that the height of the back wall 8a is about equal to the height of the folded airbag 11 in the case 8. The height of a side wall 8c of the case 8 is increased with decreasing distance to the back wall 8a from the front wall 8b, and the height of the side wall 8c and the height of the back wall 8a are the same near the back wall 8a. The corner formed by the back wall 8a and the side wall 8c forms a corner cover portion 9 which covers a corresponding one of corner portions on the back side of the folded airbag 11.

Figure 5:
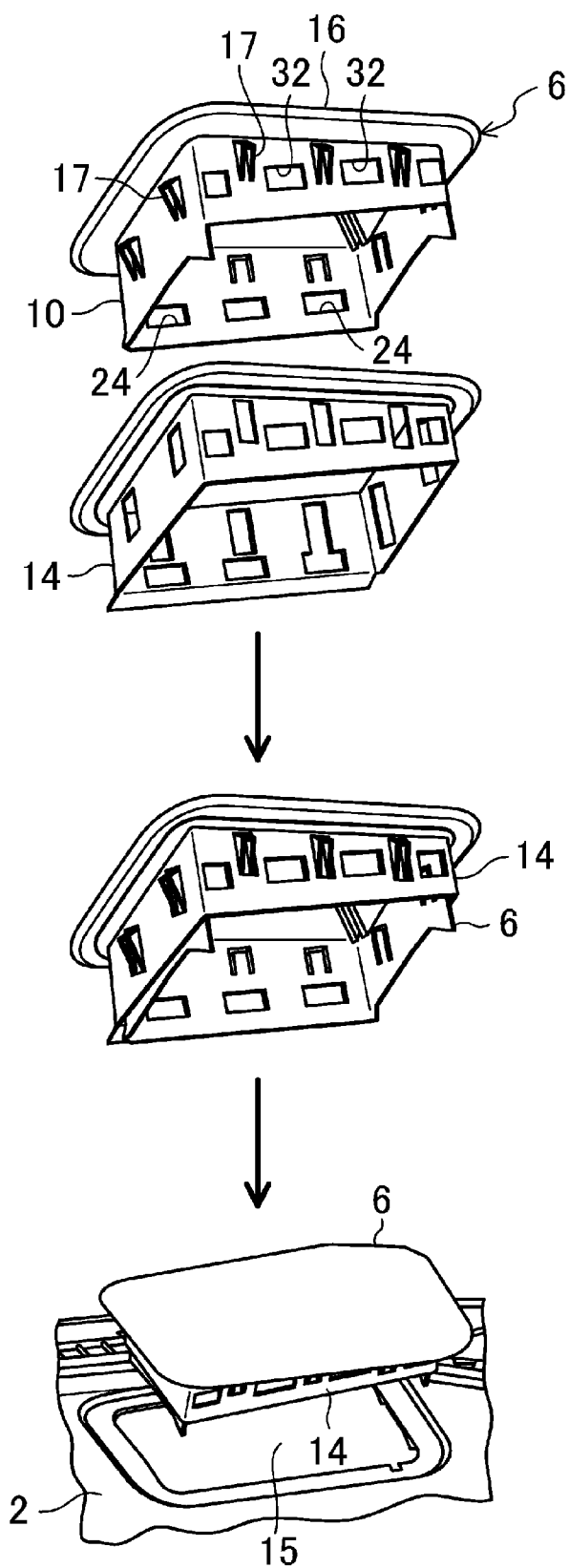
FIG. 5 is an oblique view illustrating a state in which an airbag chute according to the first embodiment is mounted in the instrument panel.

The airbag chute 6 includes a chute sleeve 10 made of a synthetic resin for allowing the airbag 11 to expand, and front and back flaps 13 which cover an upper end opening of the chute sleeve 10. These flaps 13, together with a portion of the trim 3 at which the cleavage groove 3c is formed, form the cleavage lid 1a. The chute sleeve 10 is a rectangular sleeve corresponding to the shape of the case 8 of the airbag module 5, and as shown in FIG. 5, the chute sleeve 10 is reinforced by a sleeve-like reinforcement member 14 made of a steel sheet which prevents the chute sleeve 10 from being deformed during the expansion of the airbag 11.

The airbag chute 6 is supported on the panel body 2 of the instrument panel 1. Specifically, as shown in FIG. 5, an airbag opening 15 is formed in the upper wall of the panel body 2. A flange 16 is provided at the upper end of the chute sleeve 10, and claws 17 are provided on the outer surface of the sleeve wall. The chute sleeve 10 is inserted into the airbag opening 15 of the panel body 2 from above, and the airbag chute 6 is held at the periphery of the airbag opening 15 of the panel body 2 by the flange 16 and the claws 17.

Now, a structure for supporting the airbag module 5 will be described.

First, the airbag chute 6 is mounted on the upper wall of the instrument panel 1 as described above, and the chute sleeve 10 of the airbag chute 6 protrudes downward from the instrument panel 1. The front wall and the back wall of the chute sleeve 10 respectively form a front support 18 and a back support 19 for the airbag module 5.

As shown in FIG. 2, the airbag module 5 is held on the front support 18 of the airbag chute 6 by a front hook 21, and supported on a steering member (i.e., a high-strength member which supports a steering shaft, etc.) 22 extending in a vehicle width direction inside the instrument panel 1. A space is provided between the back support 19 of the airbag chute 6 and the steering member 22, for allowing the airbag module 5 to go through.

The back plate 7 is placed to face the space, so that the back plate 7 can receive the airbag module 5 from the back side. An upper portion of the back plate 7 is held on the back support 19 by a back hook 23, and a lower portion of the back plate 7 is supported on the steering member 22. The structure will be described in detail below.

A plurality of engagement holes 24 are formed in the front support 18 of the airbag chute 6 at intervals in the vehicle width direction, as shown in FIG. 5. The airbag module 5 is held on the front support 18 by inserting the front hook 21 fixed on the front wall of the case 8 into a corresponding one of the engagement holes 24 from the back side.

As shown in FIG. 2, a support bracket 26 for supporting the airbag module 5 and the back plate 7 is fixed to the steering member 22. The support bracket 26 includes a support surface which faces the back side, and a bolt projects to the back side from the support surface. On the other hand, a bracket 27 is fixed to the bottom surface of the case 8 of the airbag module 5. The bracket 27 includes a first attachment portion 27a protruding downward. The airbag module 5 is supported on the steering member 22 by fastening the first attachment portion 27a of the bracket 27 to the support bracket 26 fixed to the steering member 22, with a nut from the back side.

The back plate 7 includes, as shown in FIG. 4, a stiffness portion 28 which covers a back surface of the case 8 of the airbag module 5 to prevent a deformation of the case 8 toward the back side (an expansion deformation) during the deployment of the airbag. The back hook 23 includes a plurality of back hooks 23 provided to the upper end portion of the back plate 7 at intervals in the vehicle width direction, and legs 29 extend downward from both lateral ends of the lower end portion of the back plate 7.

The stiffness portion 28 is a portion having increased stiffness with respect to a bending of the back plate 7, that is, a backward displacement of a middle portion of the back plate 7 relative to the both ends of the back plate 7 in the vehicle width direction (hereinafter this bending is called "lateral bending"), and the stiffness portion 28 is comprised of a plurality of reinforcement beads 30 extending in the vehicle width direction and arranged vertically to each other. Further, the stiffness portion 28 extends only in the vehicle width direction. The reinforcement beads 30 are structural beads obtained by forming projections and depressions on the back plate 7 during press molding of the back plate 7.

The area extending from the upper end of the stiffness portion 28 of the back plate 7 to the back hooks 23 is formed to be approximately flush with the back wall 8a of the case 8. Each of the legs 29 includes an impact absorber 31 which allows easy deformation when an impact load is applied to the instrument panel 1 from above. The impact absorber 31 is comprised of a bent portion obtained by bending part of the leg 29 to the back side like an elbow. A second attachment portion 29a is provided to the lower end portion of each of the legs 29 below the impact absorber 31.

Figure 6:
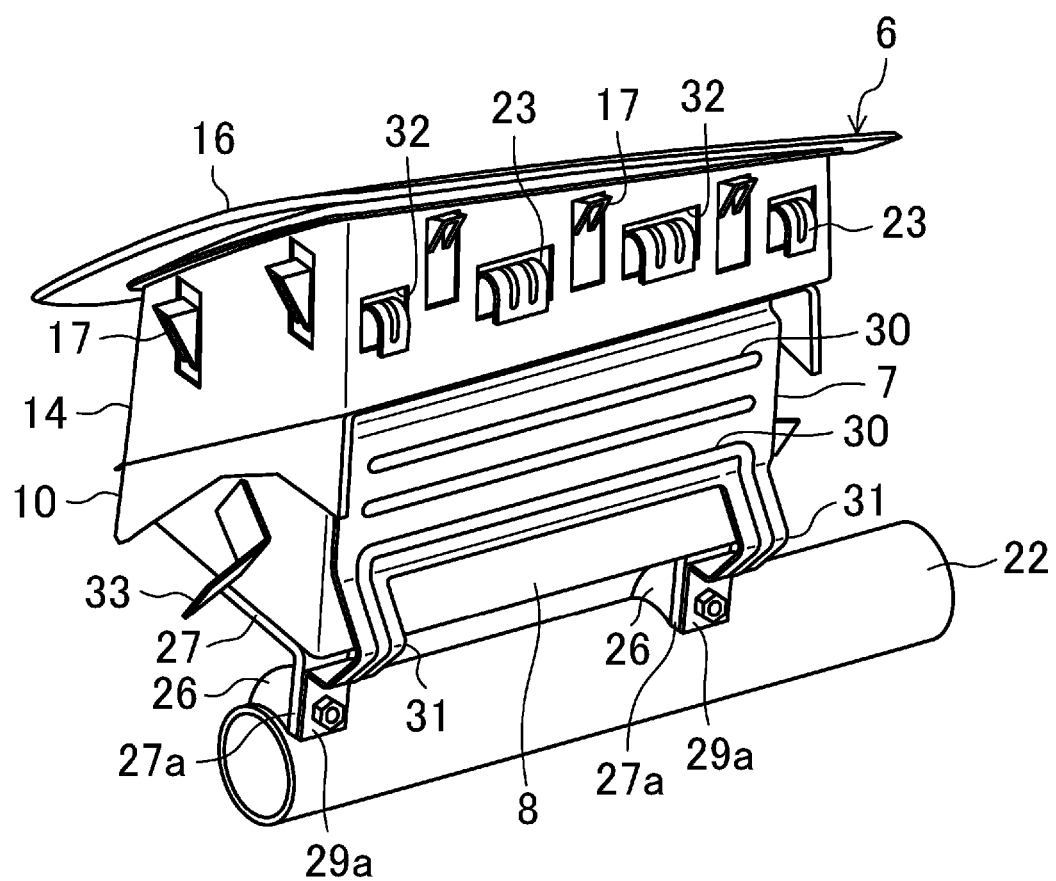
FIG. 6 is an oblique view of an airbag system without the instrument panel according to the first embodiment.

As shown in FIG. 5, the back support 19 of the airbag chute 6 is provided with a plurality of engagement holes 32 for supporting the back plate 7 at intervals in the vehicle width direction. As shown in FIG. 2 and FIG. 6, the back plate 7 is held on the back support 19 by inserting the back hooks 23 at the upper end portion of the back plate 7 into the engagement holes 32 from the front side. Further, the back plate 7 is supported on the steering member 22 by fastening the second attachment portion 29a of each of the legs 29 to the support bracket 26 fixed to the steering member 22, with a nut from the back side.

In this example, the first attachment portion 27a of the bracket 27 of the airbag module 5 and the second attachment portion 29a of the leg 29 of the back plate 7 are fastened to the support bracket 26 fixed to the steering member 22, from the same direction (i.e., from the back side), and fastened together.

Figure 7:
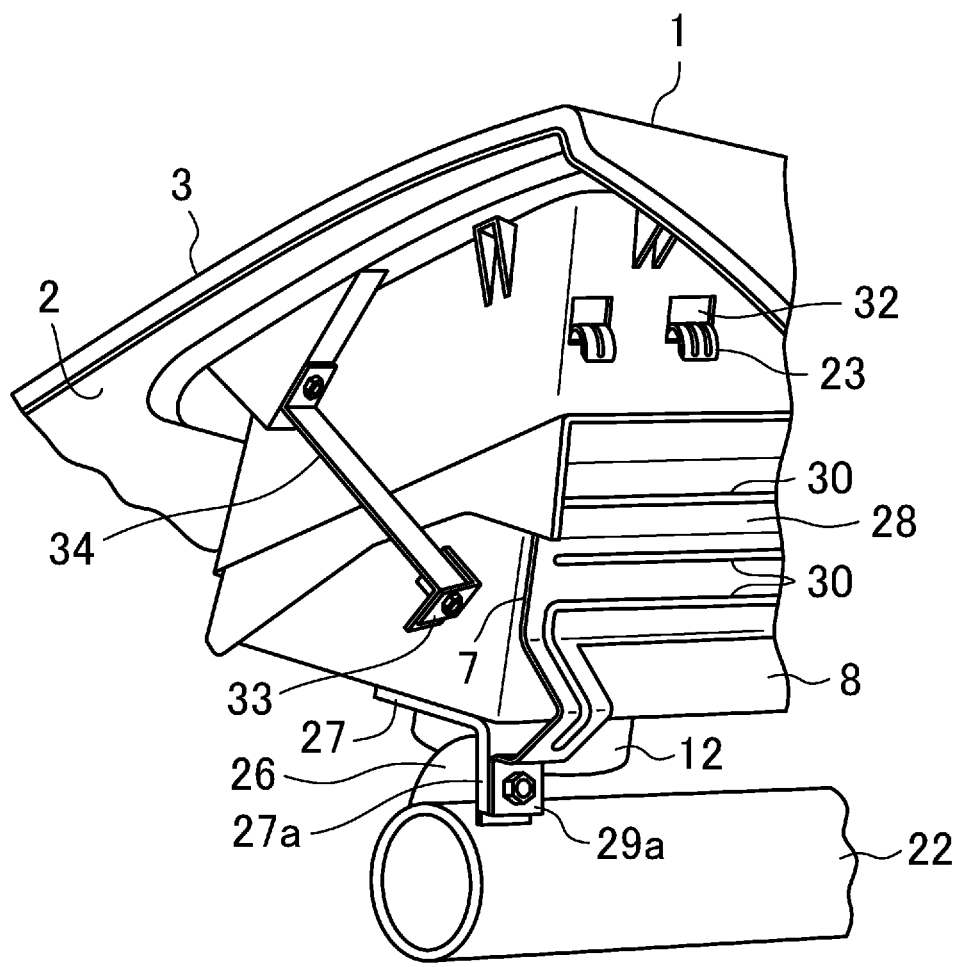
FIG. 7 is an oblique view illustrating a side portion of the airbag system according to the first embodiment.

As shown, for example, in FIG. 3, each of the side walls of the case 8 of the airbag module 5 is provided with a bracket 33. As shown in FIG. 7, the bracket 33 of the case 8 and the instrument panel body 2 are coupled to each other by a support rod 34.

<Mounting and Removal of Airbag System to and from Vehicle>

Mounting of the airbag system 4 to a vehicle will be described. First, the sleeve-like reinforcement member 14 is fitted to the chute sleeve 10 of the airbag chute 6 as shown in FIG. 5, and in this state, the chute sleeve 10 is fitted in the opening 15 of the instrument panel body 2 from above. As a result, as shown in FIG. 2, the airbag chute 6 and the sleeve-like reinforcement member 14 are held on the periphery of the opening 15 of the panel body 2 by the flange 16 and the claws 17. The trim 3 is formed integrally with the panel body 2 to which the airbag chute 6 and the sleeve-like reinforcement member 14 are mounted.

Next, the instrument panel 1 to which the airbag chute 6 and the sleeve-like reinforcement member 14 are mounted is mounted on the vehicle, thereby accommodating the airbag module 5 inside the instrument panel 1.

Figure 8:
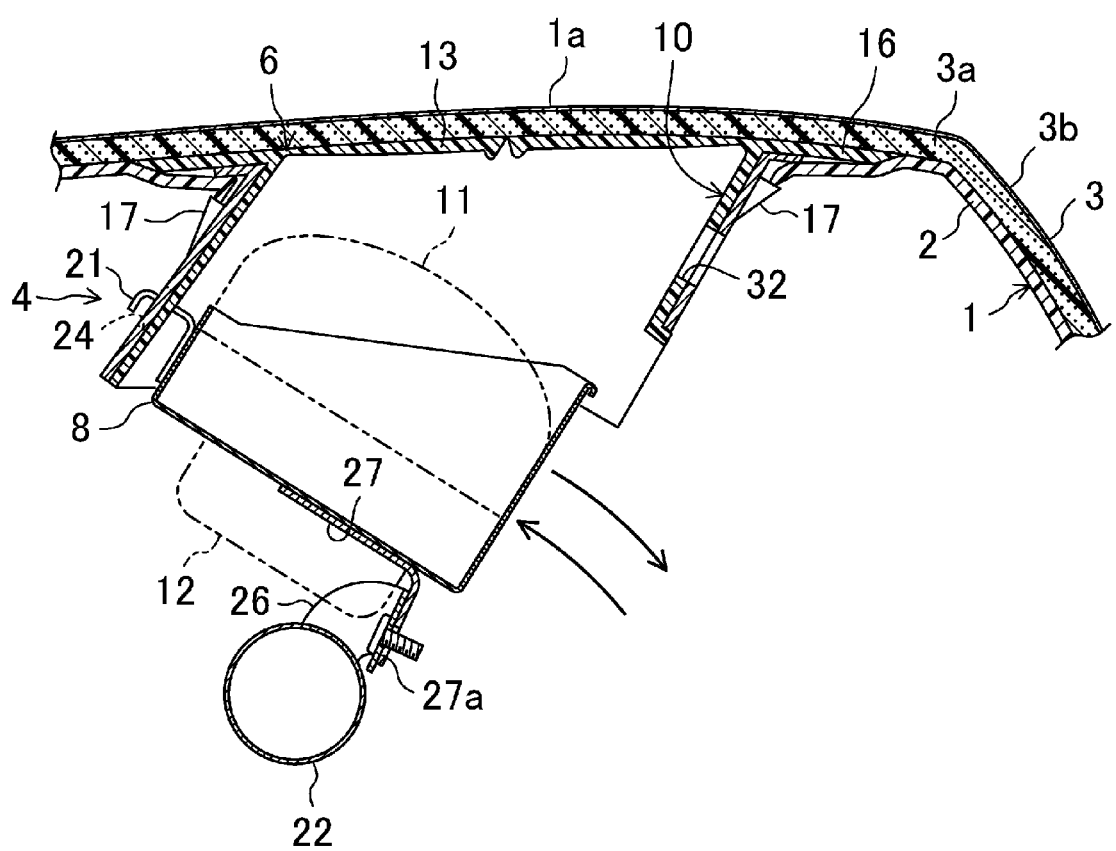
FIG. 8 is a cross-sectional view illustrating a state in which the back plate of the airbag system of the first embodiment is removed.

Specifically, as shown in FIG. 8, the airbag module 5 is inserted from the back side so that it is located above the steering member 22, through a space between the back support 19 of the airbag chute 6 and the steering member 22. The front hook 21 of the airbag module 5 is inserted, from the back side, in a corresponding one of the engagement holes 24 formed in the front support 18 of the airbag chute 6. Further, the screw hole of the first attachment portion 27a protruding downward from the case 8 of the airbag module 5 is fitted to the bolt of the support bracket 26 fixed to the steering member 22.

Next, the back hooks 23 provided to the upper end portion of the back plate 7 are inserted, from the front side, into the engagement holes 32 formed in the back support 19 of the airbag chute 6, and the screw hole of the second attachment portion 29a provided to the lower end portion of the back plate 7 is fitted to the bolt of the support bracket 26 fixed to the steering member 22. Then, a nut is fitted to the bolt, and the airbag module 5 and the back plate 7 are fastened together to the support bracket 26 fixed to the steering member 22. After that, as shown in FIG. 7, the bracket 33 of the case 8 of the airbag module 5 and the instrument panel body 2 are connected together by the support rod 34.

To remove the airbag module 5 from inside the instrument panel 1, the back plate 7 is removed first. Specifically, the nut which fastens the airbag module 5 and the back plate 7 together to the support bracket 26 is unfastened from the bolt of the bracket 26 fixed to the steering member 22. Then, the second attachment portion 29a provided to the lower end portion of the back plate 7 is removed from the bolt, and the back hooks 23 provided to the upper end portion of the back plate 7 are removed from the engagement holes 32 formed in the back support 19, thereby removing the back plate 7 from inside the instrument panel 1. As a result, a space which allows the airbag module 5 to pass through is formed between the back support 19 and the steering member 22.

Then, the support rod 34 connecting the case 8 of the airbag module 5 and the instrument panel body 2 is removed. The first attachment portion 27a protruding downward from the case 8 is removed from the bolt of the support bracket 26 fixed to the steering member 22, and the front hook 21 is removed from the corresponding one of the engagement holes 24 in the front support 18, thereby removing the airbag module 5 from the back side through the space. The support rod 34 may be removed earlier than the back plate 7.

<Airbag Deployment>

In the event of impact to a vehicle, such as frontal crashes, a sensor (not shown) detects the impact, and the gas generator 12 operates to inject gas into the airbag 11 in the case 8. The gas inflates the folded airbag 11 and causes deployment of the airbag 1, which pushes and opens the flaps 13 of the airbag chute 6 upward. As a result, the trim 3 of the instrument panel 1 is cleaved, and the airbag 11 expands in the vehicle.

During the above deployment of the airbag 11, the case 8 of the airbag module 5 is deformed such that the back wall 8a expands toward the back side due to the deployment pressure of the airbag as indicated in chain line in FIG. 3. If this deformation is large, it may cause delay in the deployment of the airbag 11 (i.e., the airbag 11 does not deploy immediately), and the deployment performance of the airbag is reduced.

In this regard, according to the present disclosure, the deformation of the back wall 8a to the back side is reduced by the back plate 7. As a result, the airbag 11 is advantageously deployed. In this case, the stiffness portion 28 of the back plate 7 includes a plurality of reinforcement beads 30 extending in the vehicle width direction. Thus, the stiffness with respect to a lateral bending is high, and the deformation of the back wall 8a to the back side is effectively reduced. Moreover, the reinforcement beads 30 are structural beads obtained by press molding. Thus, an increase in weight of the back plate 7 is prevented, and the weight of the vehicle is advantageously reduced.

Since the deployment pressure of the airbag 11 is applied to the back plate 7 as described above, a force is applied to the airbag chute 6 through the back hooks 23 of the back plate 7. However, the chute sleeve 10 of the airbag chute 6 is reinforced by the sleeve-like reinforcement member 14, and therefore, the deformation of the chute sleeve 10 is prevented and the airbag 11 smoothly deploys and expands.

Further, the case 8 includes the corner cover portion 9 which covers a corresponding one of the corner portions on the back side of the airbag 11. Thus, the corner cover portion 9 guides the deployment and expansion of the airbag 11, together with the airbag chute 6. Accordingly, although the stiffness portion 28 of the back plate 7 extends only in the vehicle width direction, the airbag 11 can deploy and expand without any trouble because the corner cover portion 9 serves as a guide. Further, the back plate 7 can be easily formed because the back plate 7 can be made of a plate which extends only in the vehicle width direction.

Further, the deployment pressure of the airbag 11 is applied to the instrument panel 1 as a force that pushes up the instrument panel 1. However, since the instrument panel body 2 and the case 8 of the airbag module 5 are connected by the support rod 34, it is possible to reduce the upward displacement of the instrument panel 1. Thus, the cleavage lid 1a is smoothly cleaved during the deployment of the airbag 11. As a result, the airbag can be smoothly deployed.

<Head Impact Protection>

In the above airbag system, the back plate 7 connects the back support 19 and the steering member 22, and includes the impact absorber 31 obtained by bending part of each of the legs 29 to the back side. Thus, the back plate 7 is significantly bent at the impact absorber 31 as indicated in chain line in FIG. 2 when an impact load F is applied to the instrument panel 1 from above, and this absorbs impact energy. As a result, a passenger is advantageously protected when the passenger collides with the upper surface of the instrument panel 1 in an accident, etc.

Other Embodiments Regarding Impact Absorber

Figure 9:
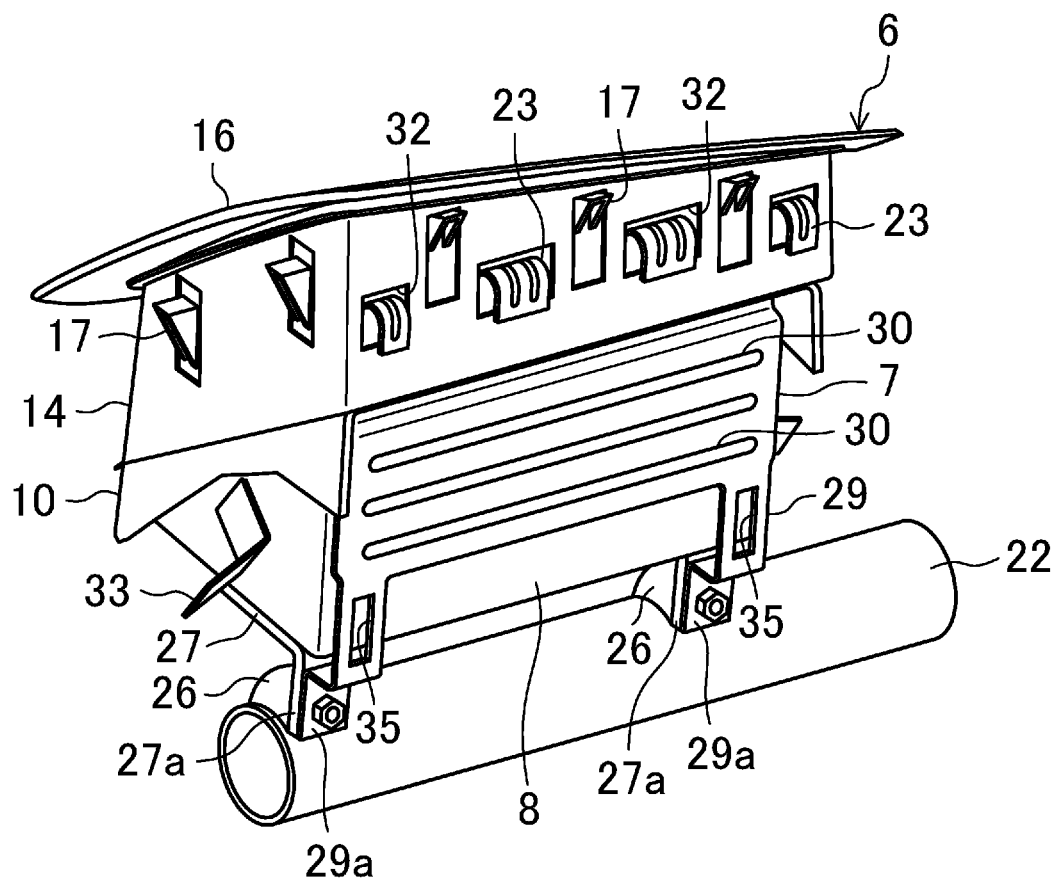
FIG. 9 is an oblique view of an airbag system according to another embodiment which is similar to FIG. 6.

FIG. 9 shows another embodiment regarding the impact absorber 31 of the back plate 7. In this embodiment, a slot 35 is formed in a flat portion of the leg 29 of the back plate 7 instead of providing a bent portion to the leg 29. This means that the impact absorber 31 is formed by partially reducing the strength of the leg 29. In this case, the flat portion having the slot 35 is deformed by the impact load, and absorbs impact.

<Others>

In the above embodiments, the first attachment portion 27a of the airbag module 5 and the second attachment portion 29a of the back plate 7 are fastened together to the bracket 26 fixed to the steering member 22. However, the steering member 22 may be provided with a bracket to which the first attachment portion 27a is fastened, and a bracket to which the second attachment portion 29a is fastened, individually.

Alternatively, the second attachment portion 29a of the back plate 7 may be fastened to the case 8 of the airbag module 5.

In the above embodiments, the chute sleeve 10 of the airbag chute 6 is reinforced by the sleeve-like reinforcement member 14. However, another reinforcement means, such as providing a reinforcement rib to the chute sleeve 10, may be adopted.

Second Embodiment

As shown in FIG. 10 to FIG. 13, according to the present embodiment, the lower end portion of a back plate 7 is supported on a lower portion of a back wall 8a of a case 8 of an airbag module 5, not on the steering member 22 as in the first embodiment. The structure will be described in detail below.

Figure 10:
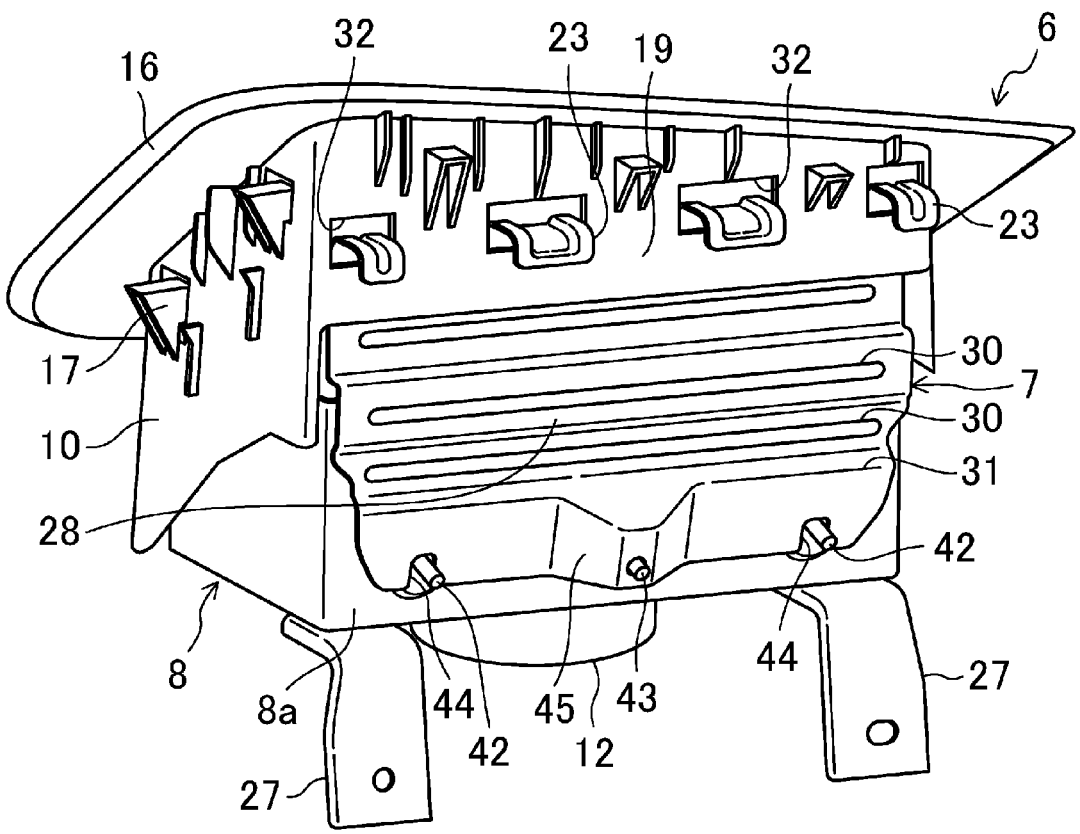
FIG. 10 is an oblique view of an airbag system according to the second embodiment which is similar to FIG. 6.

As shown in FIG. 10, the back plate 7 is held on a back support 19 by inserting, from the front side, back hooks 23 provided to the upper end portion of the back plate 7 into engagement holes 32 formed in the back support 19 of an airbag chute 6 as in the first embodiment. Further, the back plate 7 covers the back surface of the case 8 of the airbag module 5, and includes a stiffness portion 28 to prevent a deformation of the case 8 toward the back side (expansion deformation) during the deployment of the airbag. The stiffness portion 28 includes a plurality of reinforcement beads 30 extending in the vehicle width direction and arranged vertically to each other.

Figure 11:
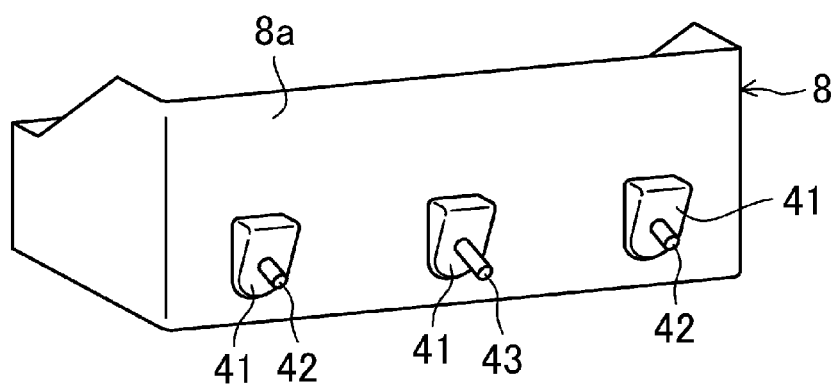
FIG. 11 is an oblique view of a case according to the second embodiment.

Further, an impact absorber 31 for head impact protection is provided at a location lower than the stiffness portion 28 of the back plate 7. The impact absorber 31 is comprised of a bent portion obtained by bending the back plate 7 to the back side like an elbow. In the present embodiment, as shown in FIG. 11, a lower portion of the back wall 8a of the case 8 is provided with a plurality of protrusions 41 which protrude to the back side and are arranged in the vehicle width direction. Each of the outermost protrusions 41 in the vehicle width direction of the back wall 8a is provided with a stud bolt 42 for fastening the back plate 7 and the case 8 to each other. The protrusion 41 located at a middle portion in the vehicle width direction is provided with a reference pin 43 for determining positioning between the back plate 7 and the case 8.

Figure 12:
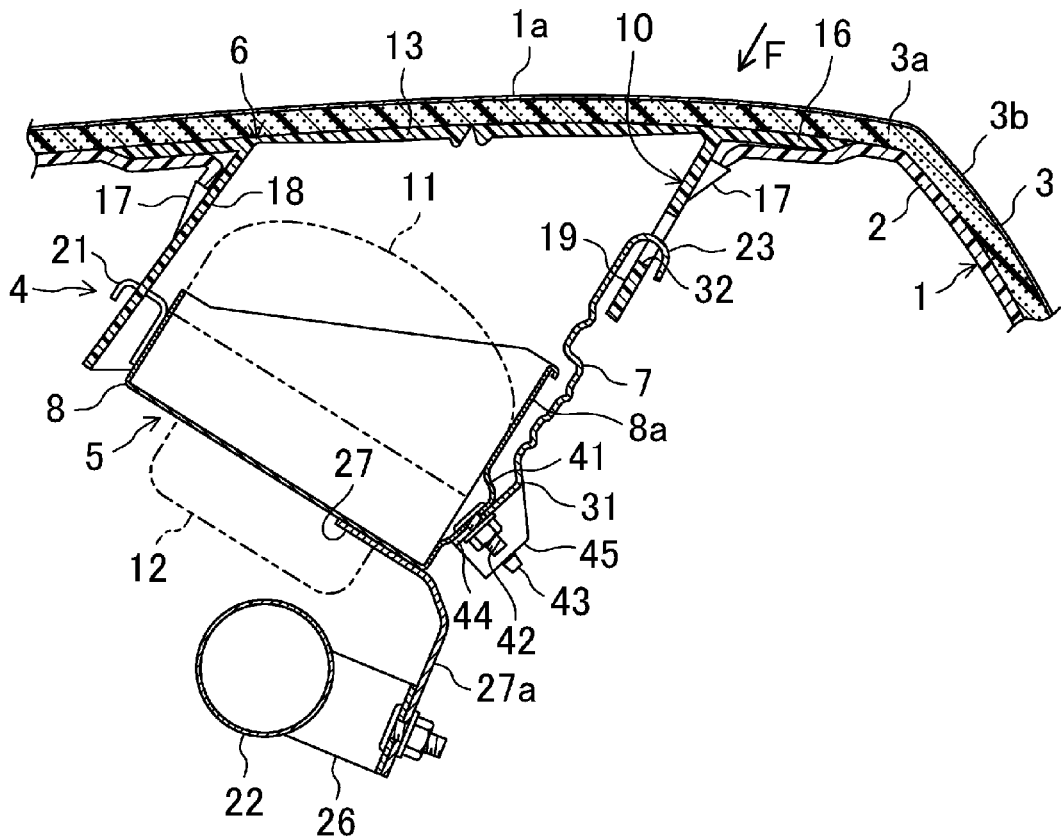
FIG. 12 is a cross-sectional view of the airbag system according to the second embodiment.
Figure 13:
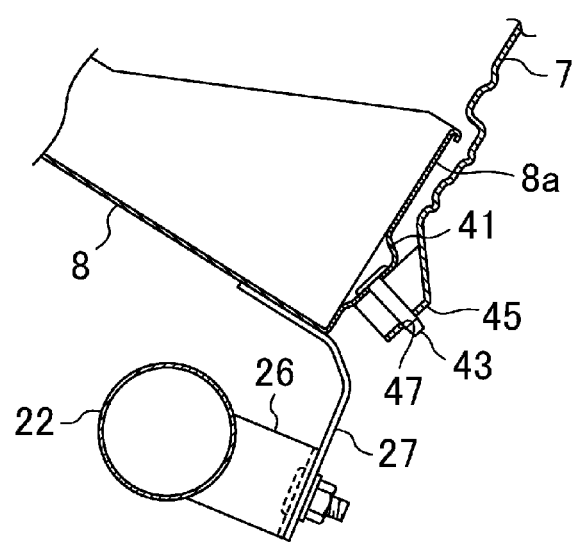
FIG. 13 is a cross-sectional view of a main part of the airbag system according to the second embodiment, taken at a position of a reference pin.

As shown in FIG. 12, a head of each of the stud bolts 42 is welded to the case 8, with the head housed in a depression formed by the protrusion 41 (i.e., the front side of the projection 41), and a shank portion (a threaded portion) of the stud bolt 42 passes through the protrusion 41 and projects to the back side. The reference pin 43 also has a head, and the head is welded to the case 8, with the head housed in a depression formed by the protrusion 41 (i.e., the front side of the protrusion 41), and a pin portion passes through the protrusion 41 and projects to the back side as shown in FIG. 13. The reference pin 43 projects to the back side more than the stud bolts 42 project to the back side.

As shown in FIG. 10, the back plate 7 has inverted U-shaped attachment notches 44 which are open downward at locations of a lower end portion of the back plate 7 which correspond to the stud bolts 42. The back plate 7 also has a raised portion 45 projecting to the back side at a location of a lower end portion of the back plate 7 which corresponds to the reference pin 43. As shown in FIG. 12, each of the attachment notches 44 of the back plate 7 is fitted to the shank portion of a corresponding one of the stud bolts 42, and a nut is fitted to the stud bolt 42 to support the lower end portion of the back plate 7 on the lower end portion of the case. As shown in FIG. 13, the reference pin 43 of the case 8 is fitted to a positioning hole 47 formed in a tip of the raised portion 45 of the back plate 7.

In the present embodiment, a square U-shaped support bracket 26 is fixed to the back surface of the steering member 22 as shown in FIG. 12 and FIG. 13. The support bracket 26 includes a support surface which faces the back side, and a bolt projects to the back side from the support surface. On the other hand, a bracket 27 is fixed to the bottom surface of the case 8. The bracket 27 includes an attachment portion protruding downward at a back portion of the bracket 27. The case 8 is supported on the steering member 22 by fastening the attachment portion of the bracket 27 to the support bracket 26 with a nut from the back side.

In the first embodiment, the sleeve-like reinforcement member 14 is fitted to the airbag chute 6, and the case 8 and the instrument panel body 2 are connected to each other by the support rod 34. However, in the second embodiment, such a sleeve-like reinforcement member and a support rod are not provided.

<Attachment of Back Plate 7>

The front hook 21 of the airbag module 5 is inserted in a corresponding one of the engagement holes 24 in the front support 18 of the airbag chute 6, and the bracket 27 protruding downward from the case 8 of the airbag module 5 is fastened to the support bracket 26 fixed to the steering member 22. Next, the back hook 23 of the back plate 7 is inserted in a corresponding one of the engagement holes 32 in the back support 19 of the airbag chute 6. Then, the lower portion of the back plate 7 is moved toward the front side to have the stud bolts 42 of the case 8 fit in the attachment notches 44 of the back plate 7. Here, the back plate 7 is positioned on the case 8 by allowing the reference pin 43 to fit in the positioning hole 47. Thus, it is possible to prevent the threaded portion of each of the stud bolts 42 from interfering with a periphery of the attachment notch 44 of the back plate 7 and being damaged. As a result, the back plate 7 is advantageously fastened to the case 8 with reliability.

<Airbag Deployment>

In the event of deployment of the airbag 11, a force which pushes the back plate 7 to the back side, with the lower end portion of the back plate 7 serving as a supporting point, is applied to the back plate 7 due to the deployment pressure. According to the present embodiment, the lower end portion of the back plate 7 is supported on the case 8, and the vertical length of the back plate 7 from this lower end supporting portion to the hook portion on the back support 19 is shorter than the vertical length of the back plate 7 in the first embodiment in which the lower end portion of the back plate 7 is supported on the steering member 22. This means that a backward bending moment applied to the back plate 7 due to the deployment pressure of the airbag 11 is small. Thus, the back plate 7 does not lean easily, which results in stable deployment of the airbag 11. Further, it is possible to prevent the back support 19 projecting downward from the instrument panel 1, from being damaged. As a result, the sleeve-like reinforcement member 14 serving as a reinforcement element of the airbag system is not necessary, and the weight of the airbag system can be advantageously reduced.

Further, in the second embodiment, the heads of the stud bolts 42 and the reference pin 43 are housed in the depressions formed by the respective protrusions 41 on the back wall 8a of the case 8. Thus, the heads do not project in the case 8. Accordingly, the airbag 11 and the gas generator 12 are advantageously accommodated in the case 8, and the airbag 11 is advantageously deployed in a smooth manner.

<Others>

In the second embodiment, as well, it is possible to provide the support rod 34 for connecting the case 8 and the instrument panel body 2.

Further, the back plate 7 may have bolt insertion holes, instead of having the inverted U-shaped attachment notches 44.

What is claimed is:

1. A vehicle airbag system, comprising:
an airbag module located inside an instrument panel, the airbag module having an airbag accommodated in a case and a gas generator which generates an airbag inflation gas, wherein
the vehicle airbag system includes
a front support located at a front side of the airbag module and protruding downward from the instrument panel;
a back support located at a back side of the airbag module and protruding downward from the instrument panel; and
a back plate located on a back side of the case and having a stiffness portion which reduces deformation of the case toward the back side in the event of deployment of the airbag, wherein
the case is supported on a steering member extending in a vehicle width direction inside the instrument panel, and is held on the front support, and
the back plate is supported on the steering member or the case, and an upper portion of the back plate is held on the back support,
an impact absorber, which allows easy deformation when an impact load is applied to the instrument panel from above, is provided at a location lower than the stiffness portion of the back plate,
the impact absorber is comprised of a bent portion obtained by bending part of the back plate toward the back side,
a lower end portion of a back wall of the case being provided with a plurality of projections which project to the back side,
a head of a stud bolt being housed in a depression formed by a corresponding one of the projections, and a shank portion of the stud bolt passing through the corresponding one of the protections, and
a lower end portion of the back plate being supported on the back wall of the case with a nut fastened to the stud bolt.

2. A vehicle airbag system, comprising:
an airbag module located inside an instrument panel, the airbag module having an airbag accommodated in a case and a gas generator which generates an airbag inflation gas, wherein
the vehicle airbag system includes
a front support located at a front side of the airbag module and protruding downward from the instrument panel;
a back support located at a back side of the airbag module and protruding downward from the instrument panel;
a back plate located on a back side of the case to reduce deformation of the case toward the back side in the event of deployment of the airbag;
corner cover portions which are provided to the case and which cover both corner portions on a back side of the folded airbag,
a plurality of projections which are provided to a lower end portion of a back wall of the case and which project to a back side, and
a stud bolt whose head is housed in a depression formed by a corresponding one of the projections, and whose shank portion passes through the corresponding one of the projections to project to a back side, wherein
the airbag is folded into a rectangular shape in plan view and is accommodated in the case,
the case is supported on a steering member extending in a vehicle width direction inside the instrument panel, and is held on the front support,
the back plate includes
a stiffness portion including a plurality of beads which extend only in the vehicle width direction and which are arranged vertically to each other, and
an impact absorber comprised of a bent portion obtained by bending part of the back plate toward the back side, the impact absorber being provided at a location lower than the stiffness portion and allowing easy deformation when an impact load is applied to the instrument panel from above, and
a lower end portion of the back plate is supported on the back wall of the case with a nut fastened to the stud bolt, and an upper portion of the back plate is held on the back support.

3. A vehicle airbag system, comprising:
an airbag module located inside an instrument panel, the airbag module having an airbag accommodated in a case and a gas generator which generates an airbag inflation gas, wherein
the vehicle airbag system includes
a front support located at a front side of the airbag module and protruding downward from the instrument panel;
a back support located at a back side of the airbag module and protruding downward from the instrument panel; and
a back plate located on a back side of the case and having a stiffness portion which reduces deformation of the ease toward the back side in the event of deployment of the airbag, wherein
the case is supported on a steering member extending in a vehicle width direction inside the instrument panel, and is held on the front support,
an upper portion of the back plate is held on the back support,
a lower end portion of a back wall of the case is provided with a plurality of projections which project to the back side,
a head of a stud bolt is housed in a depression formed by a corresponding one of the projections, and a shank portion of the stud bolt passes through the corresponding one of the projections, and
a lower end portion of the back plate is supported on the back wall of the case with a nut fastened to the stud bolt.

4. The vehicle airbag system of claim 3, wherein
the stiffness portion of the back plate includes a plurality of beads extending in the vehicle width direction and arranged vertically to each other.

5. The vehicle airbag system of claim 3, wherein
the airbag is folded into a rectangular shape in plan view and is accommodated in the case, and
the stiffness portion of the back plate extends only in the vehicle width direction, and the case includes corner cover portions which cover both corner portions of a back side of the folded airbag.

6. The vehicle airbag system of claim 3, wherein
the front support and the back support are comprised of a front portion and a back portion of a sleeve-like airbag chute fixed to the instrument panel, and a sleeve-like reinforcement member is fitted to the airbag chute to reduce deformation of the airbag chute in the event of expansion of the airbag.

\* \* \* \* \*

UNITED STATES PATENT AND TRADEMARK OFFICE
CERTIFICATE OF CORRECTION

PATENT NO. : 8,690,184 B2
APPLICATION NO. : 13/608932
DATED : April 8, 2014
INVENTOR(S) : Toshiteru Yoshimura et al.

It is certified that error appears in the above-identified patent and that said Letters Patent is hereby corrected as shown below:

Title Page:

Item (75) Inventors should read: Toshiteru Yoshimura, Hiroshima (JP);
Tsuyoshi Shimono, Hiroshima (JP);
Daisuke Matsuoka, Hiroshima (JP);
Yumehito Tamura, Hiroshima (JP);
Koji Kuwabara, Hiroshima (JP);
Masayoshi Ono, Hiroshima (JP);
Hiroyuki Kawai, Hiroshima (JP);
Kazuhiro Tanaka, Hiroshima (JP)

Signed and Sealed this
Eighth Day of July, 2014

Michelle K. Lee
*Deputy Director of the United States Patent and Trademark Office*